United States Patent
Ross et al.

(10) Patent No.: US 7,421,689 B2
(45) Date of Patent: Sep. 2, 2008

(54) PROCESSOR-ARCHITECTURE FOR FACILITATING A VIRTUAL MACHINE MONITOR

(75) Inventors: Jonathan K. Ross, Woodinville, WA (US); Dale Morris, Steamboat Springs, CO (US); Donald C. Soltis, Jr., Fort Collins, CO (US); Rohit Bhatia, Fort Collins, CO (US); Eric Delano, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1040 days.

(21) Appl. No.: 10/695,267

(22) Filed: Oct. 28, 2003

(65) Prior Publication Data

US 2005/0091652 A1    Apr. 28, 2005

(51) Int. Cl.
*G06F 9/455* (2006.01)
(52) U.S. Cl. .................... 718/1; 718/100; 712/1
(58) Field of Classification Search ........ 718/1, 718/100; 364/200; 712/1–43, 200–203, 712/216–248
See application file for complete search history.

(56) References Cited

U.S. PATENT DOCUMENTS

| 4,787,031 A | * | 11/1988 | Karger et al. ............... 718/100 |
| 6,895,491 B2 | * | 5/2005 | Kjos et al. ................... 711/203 |
| 2003/0037089 A1 | * | 2/2003 | Cota-Robles et al. .......... 709/1 |

* cited by examiner

*Primary Examiner*—Meng-Ai An
*Assistant Examiner*—Diem K Cao

(57) ABSTRACT

Virtual-machine-monitor operation and implementation is facilitated by number of easily implemented features and extensions added to the features of a processor architecture. These features, one or more of which are used in various embodiments of the present invention, include a vmsw instruction that provides a means for transitioning between virtualization mode and non-virtualization mode without an interruption, a virtualization fault that faults on an attempt by a priority-0 routine in virtualization mode attempting to execute a privileged instruction, and a flexible highest-implemented-address mechanism to partition virtual address space into a virtualization address space and a non-virtualization address space.

12 Claims, 15 Drawing Sheets

PROCESSOR-ARCHITECTURE FOR FACILITATING A VIRTUAL MACHINE MONITOR

TECHNICAL FIELD

The present invention is related to computer processor architectures and, in particular, to processor-architecture-feature extensions that facilitate virtual-machine-monitor operations.

BACKGROUND OF THE INVENTION

The present invention is related both to computer processor architectures and to a layer of software, called a virtual machine monitor that abstracts a computer processor to provide a virtual machine interface to one or more operating systems. Therefore, a brief overview of computer systems, processors, and virtual machine monitors is provided in this subsection.

FIG. 1 shows a high level overview of the core processing components of a computer system. The core components include a processor 102, one or more memories 104, and a system bus 106 interconnecting the processor 102, memory 104, and a bus bridge 108 that interconnects the system bus 106 with a second-level bus 110. The second-level bus 110 is, in turn, interconnected, via bus bridges 112-113, with I/O busses 114-115, respectively. Various controllers 116-121, including communications controllers, mass-storage-device controllers, video-display controllers, and other such controllers, are connected to the processor 102 and memory 104 via the I/O busses 114 and 115, bus bridges 112-113, secondary-level bus 110, bus bridge 108, and the system bus 106. Many modern computer systems feature multiple processors, multiple, tiered memories, and a large number of additional components and busses. Data flows into the computer system via communications ports, including input devices, mass-storage devices, and other such data sources connected to controllers 116-121, and data flows out from the computer system from memory 104 to various output devices, including communications ports, mass-storage devices, video displays, and other such devices through the various controllers 116-121.

FIG. 2 illustrates the overall function of a computer processor. It should be noted that FIG. 2 is a vast simplification of the many interrelated functional units within a modern processor, but most of this complexity is not relevant to the current invention, and therefore neither illustrated nor discussed. The processor 200 includes a number of general registers 202, a number of control registers 204, and one or more processor status registers ("PSRs") 206. These registers are essentially small units of extremely high-speed memory integrated with the various execution and control components within the processor. The heart of the processor, in many ways, is a group of components collectively referred to, in FIG. 2, as the instruction-execution engine 208. The instruction-execution engine 208 interfaces to a collection of components referred to, in FIG. 2, as the system-bus interface and memory-access-for-read component 210 which allows the instruction-execution engine 208 to read data and instructions from memory via the system bus. The instruction-execution engine executes instructions retrieved from memory, using the general registers 202 for storing and retrieving temporary results from instruction execution. In the course of executing instructions, the instruction-execution engine may output data to a system-bus interface and memory-access-for-write component 212. Thus, a processor, at a highest level of description, is essentially an instruction-execution engine that reads instructions and data from memory and that writes data and instructions to memory.

The instruction-execution engine is controlled, in various ways, by the contents of the control registers 204 and status registers 206. In addition, a processor may receive various inputs in addition to instructions and data sets from memory, including interruption signals and data retrieved from registers within controllers and other external devices. Similarly, a processor may generate interruption signals and other such signals, and may write data to registers within controllers and other external devices. For the most part, processor function is controlled by instructions fetched from memory and executed by the instruction-execution engine. In addition, built-in logic within the processor may execute complex functionality that supports the instruction-execution engine and that responds to various external signals and internal conditions.

FIG. 3 shows the overall organization of logic within a computer system. At the lowest, most fundamental level 302 are the hardware/firmware components of the computer system, including those components shown in FIG. 1 and various peripheral and additional logic-containing devices. The hardware/firmware level is the least abstract, physical, logic layer. However, a modem computer system containing only a hardware/firmware physical logic layer is almost completely useless. The hardware/firmware layer supports instruction execution and component intercommunication, as described above, but, by itself, has no way of acquiring instructions to execute. The next highest logic layer in FIG. 1 is commonly referred to as the "operating system" 304. Operating systems were first developed as relatively simple collections of assembler-language routines for facilitating largely tediously manual operation of stand-alone, one-task-at-a-time computers. As the complexity of computer systems has increased over time, and the variety and number of internal and external components interconnected within and to computer systems have grown, computer operating systems have become correspondingly much larger and far more complex. Even operating systems for relatively simple personal computers now routinely comprise many megabytes of computer instructions. Operating systems provide a huge number of routines for interconnecting and controlling the various components of a computer system, and provide interfaces both to application software programs as well as to human users.

A computer system comprising the hardware/firmware logic layer 302 and an installed, booted, and properly functioning operating system 304 provides to a user an input environment through which the user can input various commands and receive responses to those commands from the operating system. However, the set of commands provided by an operating system are rather limited in scope and functionality. The complex, useful functionality provided by modern computers is generally implemented in application programs that run within the application-program-execution environment provided by the hardware/firmware logic layer 302 combined with the operating system 304. In FIG. 3, various application programs, such as application program 306, are shown at the highest logic layer within the computer system. Application programs include word-processing programs, games, database-management systems, spreadsheets, email applications, compilers, and high-level programming and development environments.

Many different operating systems are currently commercially available. Some operating systems, such as the Microsoft XP® operating system, can be run on a variety of different hardware platforms. Initially, operating systems were ported, by extensive modification, to each different hardware platform on which they ran. A more modern approach is to create a variety of different logic levels within an operating system, and to isolate hardware-platform dependencies within a hardware-dependent layer within the operating system. By designing operating systems in this fashion, only the relatively small, hardware-dependent layer needs to be modified when porting the operating system to a different hardware/firmware logic layer.

In addition to facilitating operating-system hardware independence, the concept of a hardware-dependent layer has led to a more general virtual-machine-monitor layer. FIG. 4 illustrates logical layers within a computer system employing a virtual-machine monitor. As can be seen by comparing FIG. 4 to FIG. 3, the virtual-machine-monitor layer 402 is interposed between the hardware/firmware logic layer 404 and an operating-system logic layer 406. However, unlike the single-operating-system computer illustrated in FIG. 3, the virtual machine monitor 402 can support multiple, concurrently functioning operating systems, referred to as "guest operating systems." The virtual machine monitor is a rather thin layer, with respect to functionality, with the guest operating systems providing the bulk of functionality traditionally supplied by an operating system directly layered above the hardware/firmware logic level. Each guest operating system, such as guest operating system 408, can generally support concurrent execution of multiple application programs, such as application programs 410-413 running within the application-execution environment provided by guest operating system 408.

The virtual machine monitor approach provides many advantages. For example, allowing concurrent execution of multiple operating systems allows a computer system to concurrently execute various operating-system-specific application programs, without needing to port application programs designed to execute within the application-program-execution environment provided by one operating system to the application-program-execution environment provided by another operating system. Different operating systems may have different sets of advantages and disadvantages, and by concurrently running multiple operating systems, a user may selectively employ specific operating systems that offer the greatest advantages and least disadvantages for particular tasks. A virtual machine monitor can be designed to provide many different machine interfaces through operating systems, so that, for example, an operating system can be tested and debugged on a computer system with a virtual machine monitor simulating a particular hardware/firmware interface prior to development of that hardware/firmware interface. When the hardware/firmware interface becomes available, the operating system can be immediately used on the newly available hardware/firmware interface, rather than becoming available only after a lengthy testing and debugging process.

There are many different approaches to creating virtual machine monitors. At one extreme, the virtual machine monitor would offer a defined, standard interface to all guest operating systems, and the guest operating systems would be developed to conform to this interface. However, the more common approach, and rather opposite approach, is for a virtual machine monitor to simulate or emulate the hardware/firmware platform interface to which a guest operating system was originally developed. Because the virtual machine monitor is generally a much smaller and simpler program, it is easier to modify the virtual machine monitor than to modify guest operating systems or require the guest operating systems be rewritten to a standard virtual machine monitor interface.

In general, virtual machine monitors provide a guest operating system with the illusion that the guest operating system is executing correctly on top of a hardware/firmware interface, and the guest operating system is generally unaware of, and completely isolated from, the other guest operating systems concurrently supported by the virtual machine monitor. In order to accomplish this, the virtual machine monitor employs many different features of the hardware/firmware layer designed for direct support of operating systems, rather than virtual machine monitors. In many cases, employment of these features by the virtual machine monitor introduces instruction-execution overhead, increased instruction-execution latencies, and other such effects that, in the aggregate, result in decreasing the performance of guest operating systems with respect to the performance that the guest operating system could achieve running directly on top of the hardware/firmware interface. In certain cases, the performance degradation is unavoidable. If two or more guest operating systems are concurrently operating, the resources provided by the hardware/firmware layer must necessarily be shared between them, with the result that each guest operating system is provided a portion of the machine resources, rather than all of the machine resources, over relatively long time periods. However, other performance degradations arise from the virtual machine monitor using hardware/firmware features that are intended for direct operating system usage. Designers, manufacturers, and users of computer systems employing virtual machine monitors have therefore recognized the need for identifying and eliminating certain types of performance degradation that result from interposing a virtual machine monitor between the hardware/firmware logic layer and guest operations systems.

SUMMARY OF THE INVENTION

In one embodiment of the present invention, a small number of relatively easily implemented features and extensions are added to the features of a processor in order to facilitate virtual-machine-monitor operation within a computer system. Features of various embodiments of the present invention, employed alone or in combination, include: a vmsw instruction that provides a means for transitioning between virtualization mode and non-virtualization mode without an interruption; a virtualization fault invoked when a process executing in virtualization mode attempts to execute an instruction that requires software virtualization assistance, including one of a number of privileged instructions; and a flexible highest-implemented-address-bit mechanism to partition the virtual address space into a virtualization address space and a non-virtualization address space. These additional, or supplemental, features, or architectural extensions, greatly expedite virtual-machine-monitor operations that support guest-operating-system execution.

DETAILED DESCRIPTION OF THE INVENTION

One embodiment of the present invention is a small set of architectural extensions to the Intel Itanium processor family that greatly facilitate virtual-machine-monitor operations that support concurrent execution of multiple operating systems in a computer system employing one or more Intel Itanium processors. In general, these architectural extensions may be applied, in concept, to other modem computer processors with architectural features similar to those of the Intel Itanium processors. While the architectural extensions, described below, are related to one another and mutually advantageous for virtual machine monitors executing on Intel Itanium processors, the architectural extensions may also be usefully used by themselves, or in various combinations, either in on Intel Itanium processors or other, similar modem computer processors.

Figure 1:
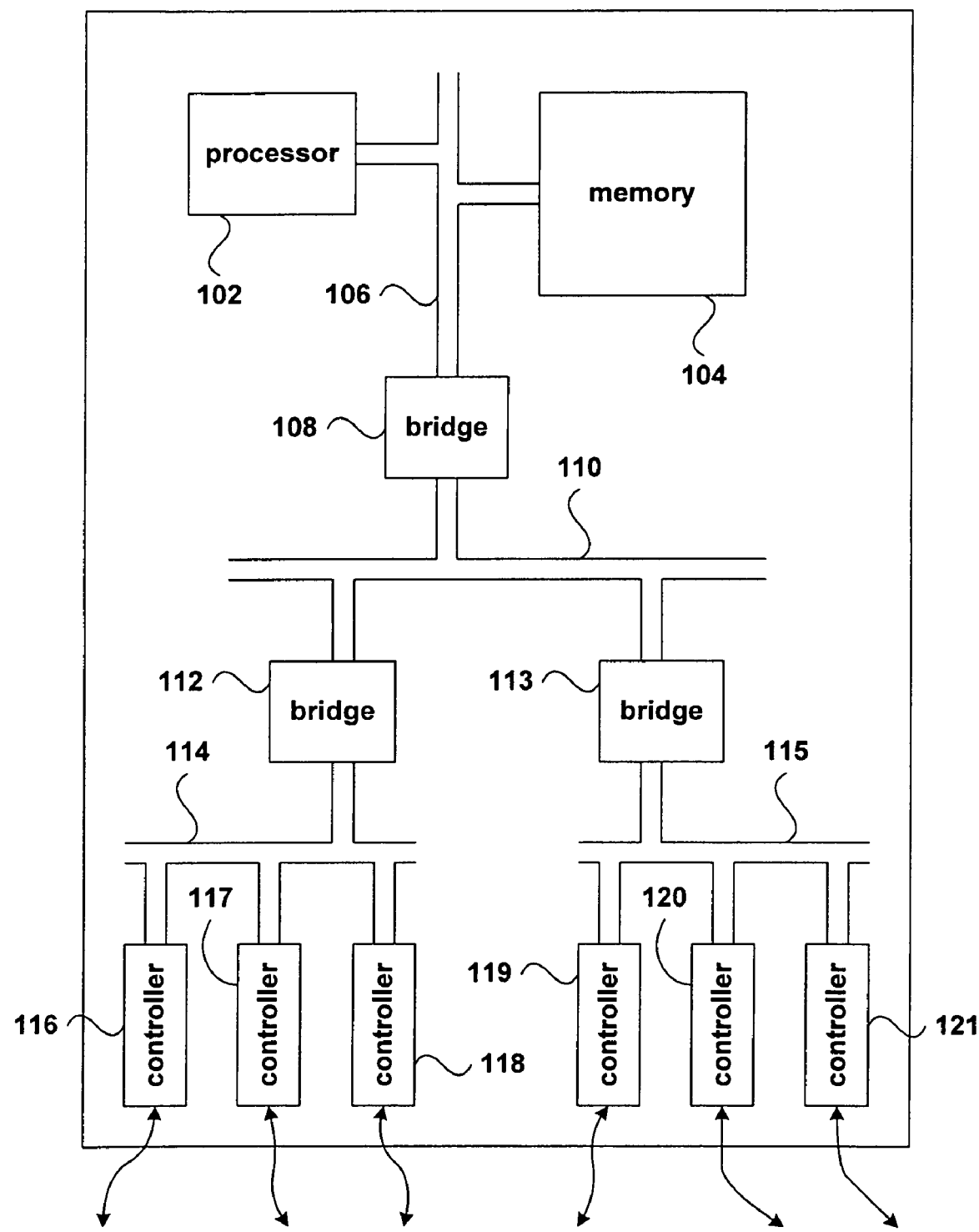
FIG. 1 shows a high level overview of the core processing components of a computer system.
Figure 2:
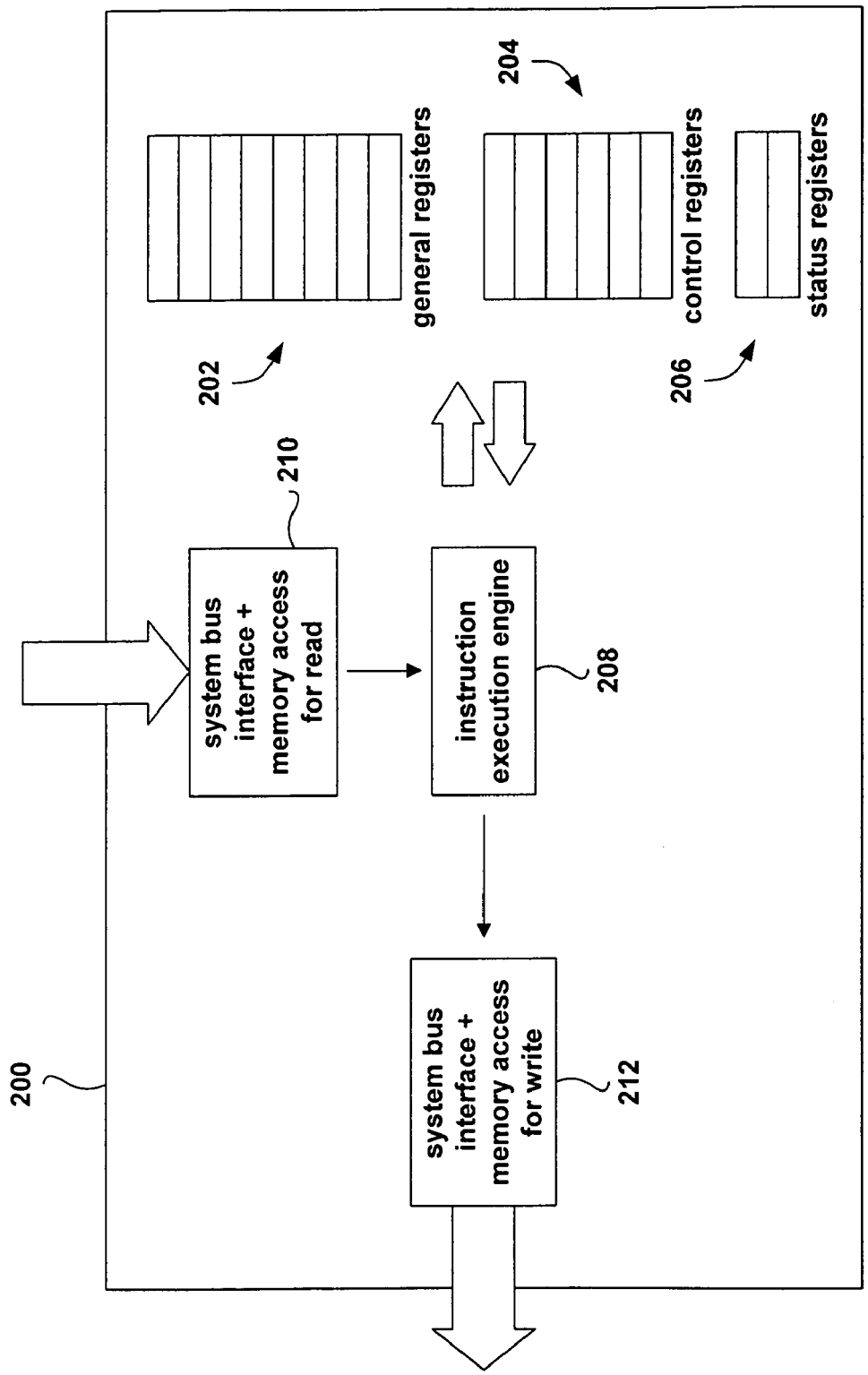
FIG. 2 illustrates the overall function of a computer processor.
Figure 3:
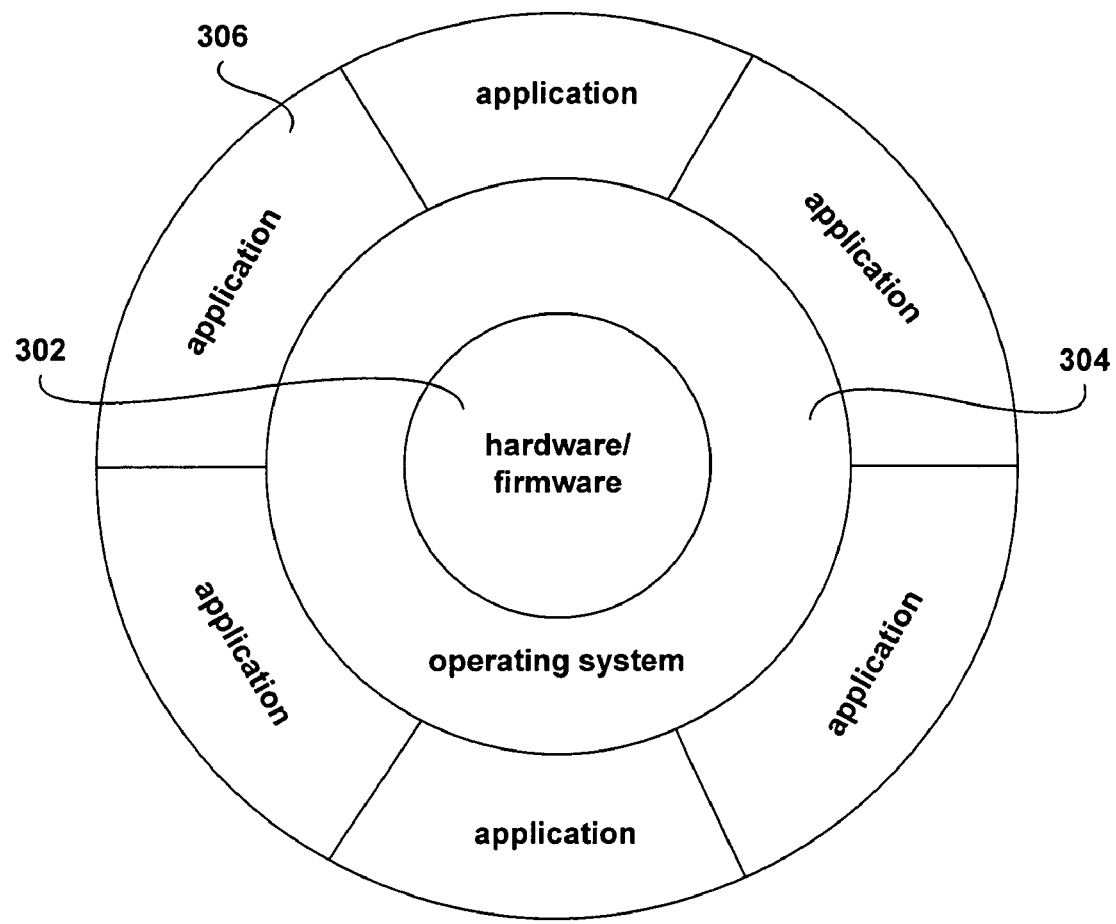
FIG. 3 shows the overall organization of logic within a computer system.
Figure 4:
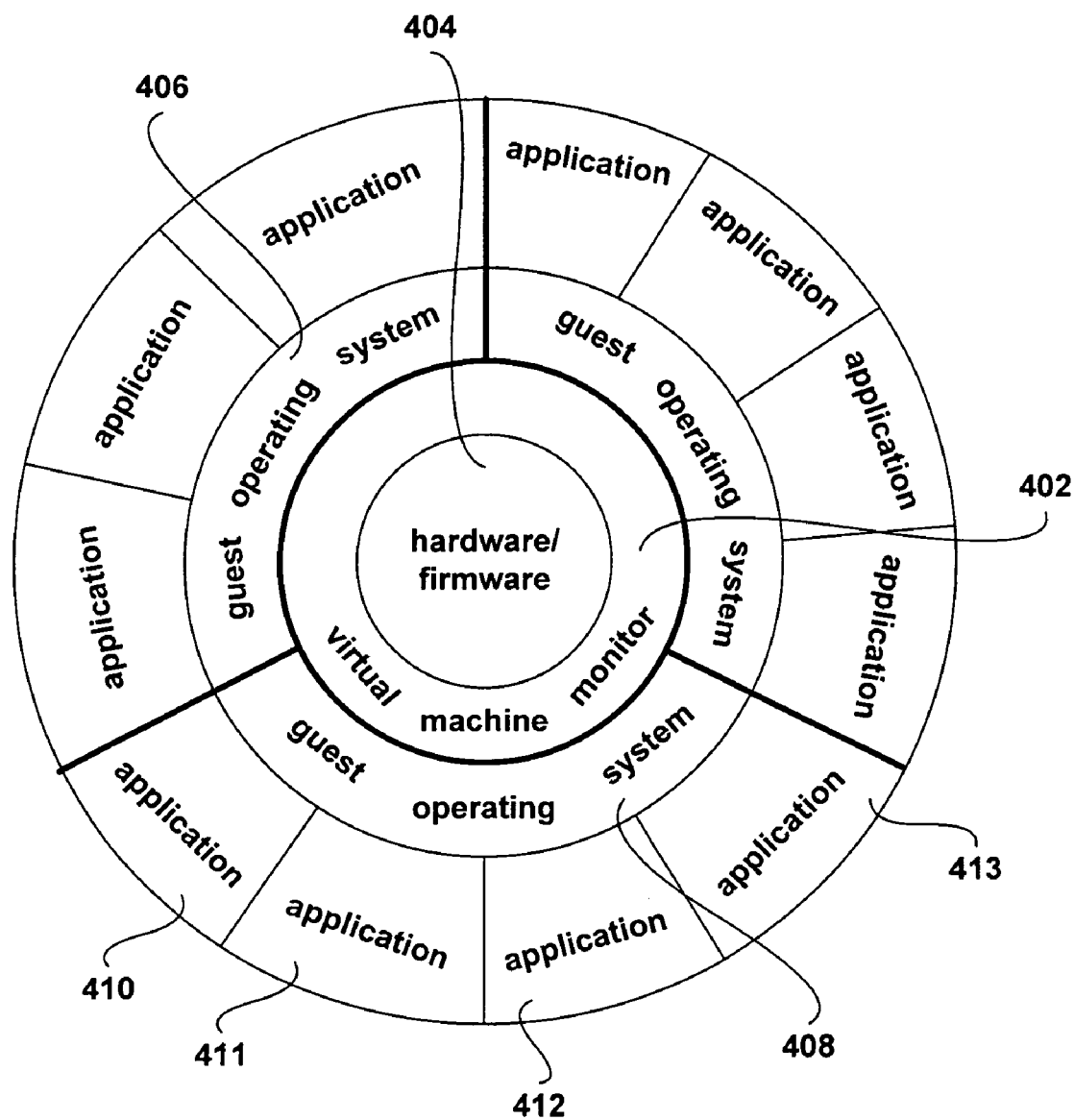
FIG. 4 illustrates logical layers within a computer system employing a virtual machine monitor.
Figure 5:
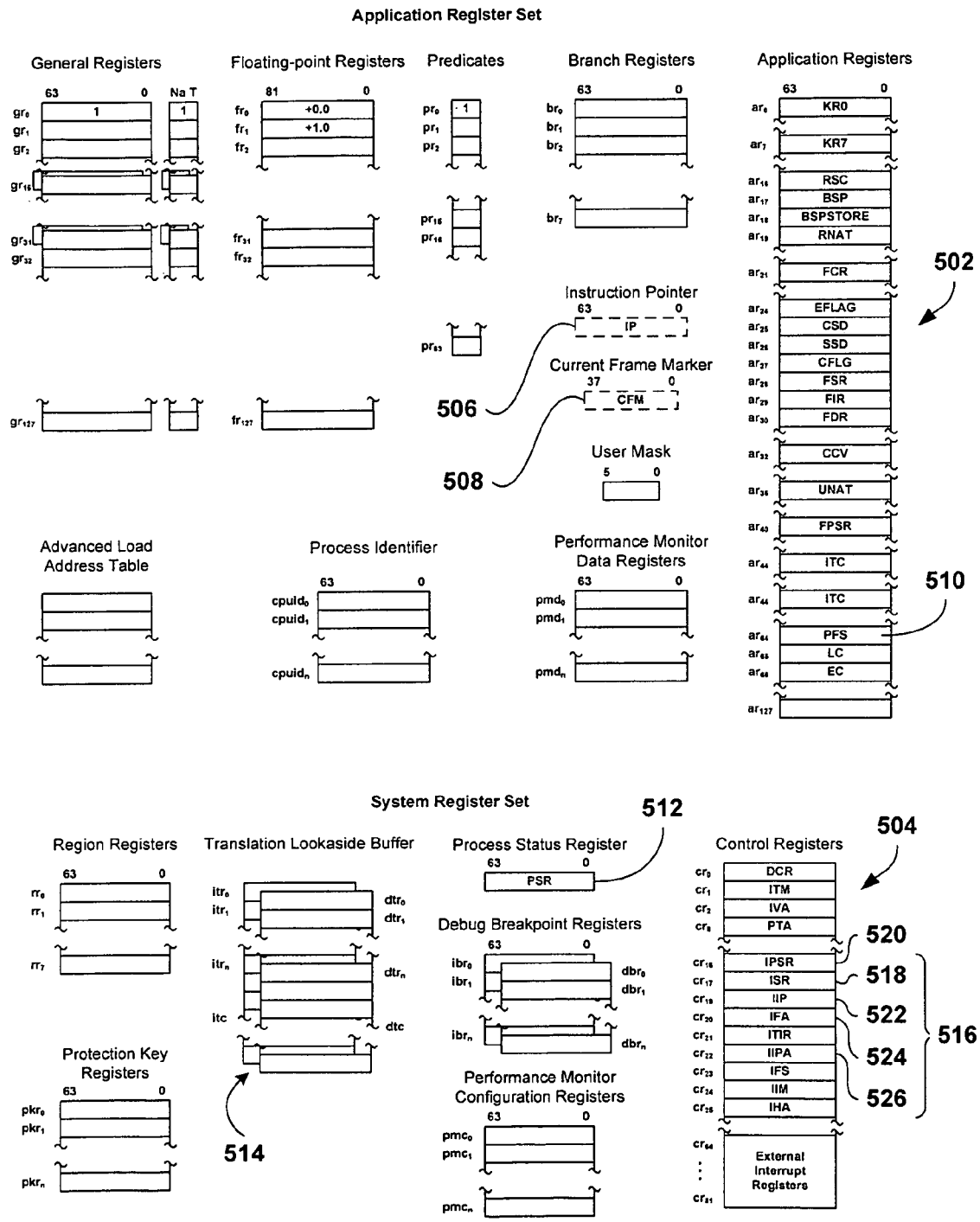
FIG. 5 shows the register set for an Intel Itanium processor.

FIG. 5 shows the register set for an Intel Itanium processor. The registers include application registers 502 and system registers 504. Application registers include an instruction-pointer register ("IP") 506, a current-frame-marker register ("CFM") 508, and a previous function-state register ("PFS") 510. System registers include a process-status register ("PSR") 512, a set of registers that together compose the translation-lookaside buffer 514, and a set of interruption-related registers 516, including the interruption-status register ("ISR") 518, the interruption-processor-status register ("IPSR") 520, the interruption-instruction-bundle-pointer register ("IIP") 522, the interruption-faulting address register ("IFA") 524, the interruption-instruction-previous-address register ("IIPA") 526.

Figure 6A:
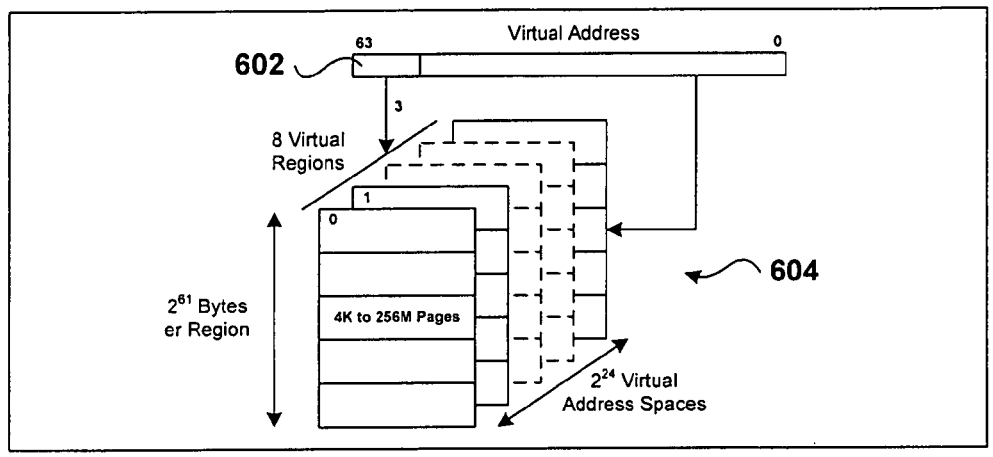
FIGS. 6A-C illustrate the virtual memory architecture of the Intel Itanium processor family.
Figure 6B:
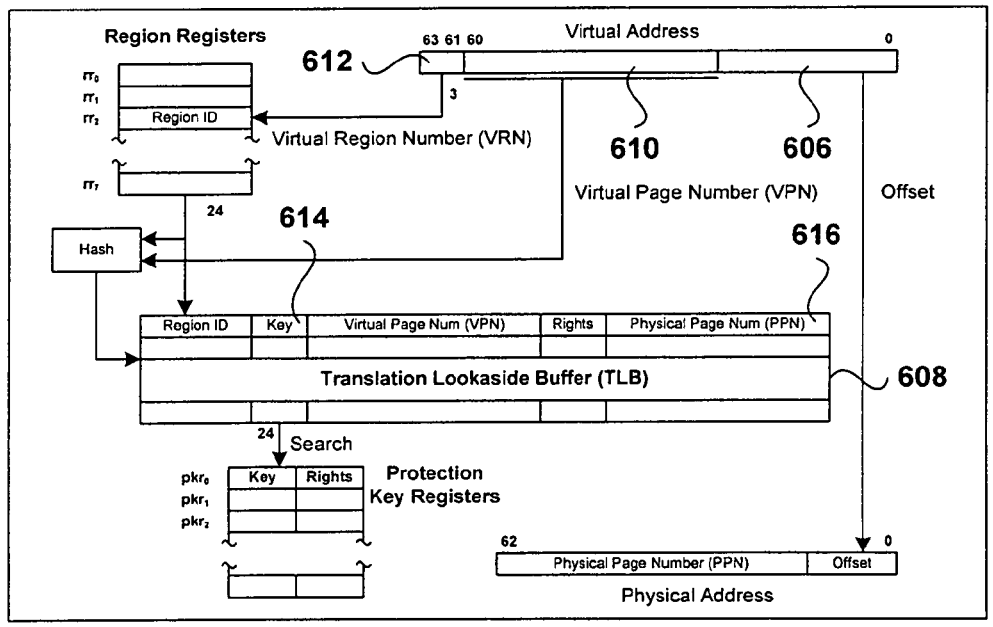
Figure 6C:
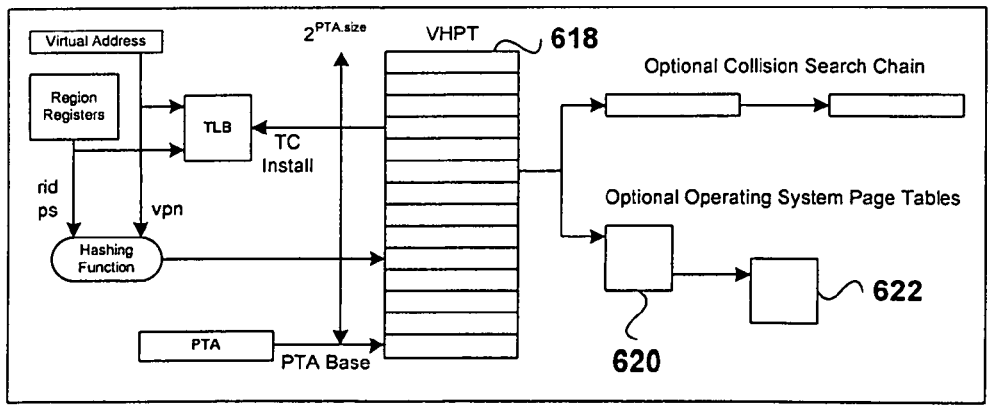

FIGS. 6A-C illustrate the virtual memory architecture of the Intel Itanium processor family. The Intel Itanium processor supports 64-bit virtual addresses. As shown in FIG. 6A, the top three bits 602 of a virtual address specify one of eight virtual regions 604, essentially separate virtual address spaces that can be provided to different execution domains so that translation-lookaside buffers need not be flushed for domain contact switches. As shown in FIG. 6B, a virtual address 606 is translated to a physical address via a translation-lookaside-buffer entry 608, essentially one of the registers that together compose the translation-lookaside buffer (514 in FIG. 5). A virtual page number 610 is extracted from a virtual address and employed, along with the region ID 612, to find the translation-lookaside-buffer entry 608 corresponding to the virtual address. Access to the virtual address by a process is permitted only when a protection-key register contains a protection key which matches the protection-key field 614 of the corresponding translation-lookaside-buffer entry 608 and the access-rights field of the translation-lookaside-buffer entry allows the type of access being attempted by the process. The translation-lookaside-buffer entry 608 contains a physical page number 616 corresponding to the virtual address that allows the virtual address to be mapped to a physical address. When a translation-lookaside-buffer entry corresponding to a virtual address cannot be found, the translation-lookaside-buffer entry may be located in page tables by the processor or by an operating system running on top of the Itanium processor. FIG. 6C shows the virtual hash page table ("VHPT") 618 that contains a second-level cache of translation-lookaside buffer entries that can be searched by the Itanium processor, which are generally backed up by additional operating-system-managed page tables 620 and 622.

Figure 7:
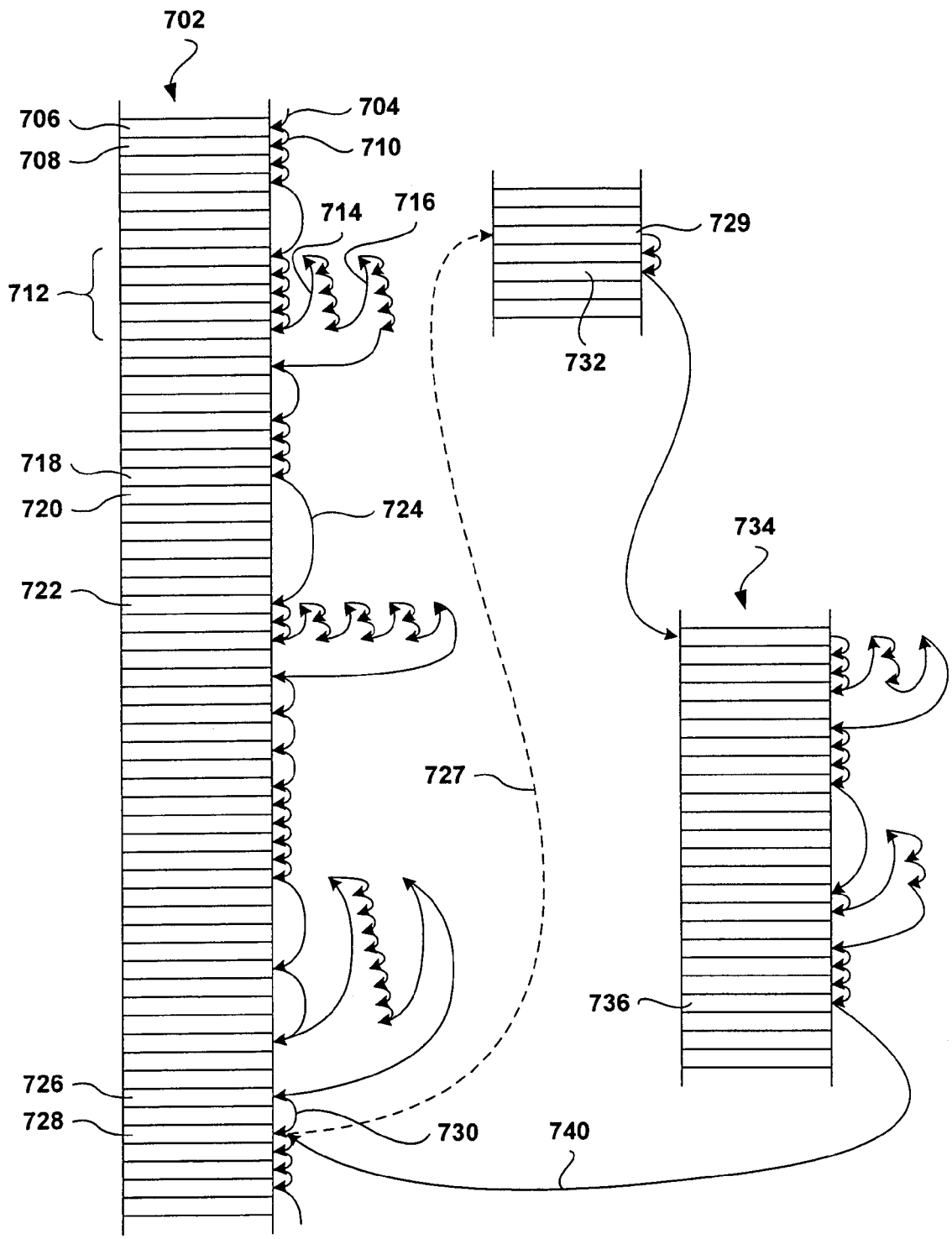
FIG. 7 illustrates the concept of an interruption.

FIG. 7 illustrates the concept of an interruption. In the Itanium processor, a number of different types of interruptions may occur. External interrupts are asynchronous interruptions generated by external devices. Faults and traps are synchronous interruptions, a fault occurring prior to execution of an instruction, and a trap occurring after execution of an instruction. Generally, a fault occurs when an instruction specifies an improper operation or, more commonly, when some OS action is required before the instruction can execute, for example, when a translation-lookaside-buffer entry cannot be found by the processor for translation of a virtual memory address specified for access by the instruction. Traps occur following an instruction execution when OS action is required after the instruction has executed.

In FIG. 7, instructions are shown in a sequence in which they are stored in memory. There is a first contiguous sequence of instructions 702 being executed by the processor, as indicated by the arrows, such as arrow 704, to the side of the contiguous set of instructions. Thus, the instruction 706 was first executed, as indicated by arrow 704, followed by instruction 708, as indicated by arrow 710. Various sets of instructions, such as a set of instructions 712, are repeatedly executed in a loop, as indicated by the backward-pointing arrows 714 and 716 in the case of the repeatedly executed set of instructions 712. In general, instructions are executed in order, except when a branch-type instruction directs execution to an instruction not following the branch instruction, such as a branch instruction 718 directing execution not to the subsequent instruction 720 but to the instruction 722, as indicated by arrow 724. Occasionally, for one of a variety of reasons, the normal execution thread, as determined by the order of instructions in memory and by the instructions themselves, such as branch instructions, is interrupted, as indicated by the dashed arrow 727 in FIG. 7. Instruction 726 executed and directed execution to instruction 728, as indicated by arrow 730. However, due to a trap arising from execution of instruction 726 or due to a fault or external interrupt arising from an attempt to execute instruction 728, the flow of instruction execution is interrupted, and instruction execution is directed to an interruption vector having, as its first instruction, instruction 729. As shown in FIG. 7, the interruption vector may contain a branch instruction 732 that directs subsequent instruction execution to an interruption handler routine, indicated in FIG. 7 by a discrete set of contiguous instructions 734. Once the interruption is handled, the interruption handler executes a return from interrupt ("rfi")

instruction 736 which restores the processor state to the state the processor was in when it was initially interrupted, and returns execution to the original flow of execution, as indicated by arrow 740 in FIG. 7.

Figure 8:
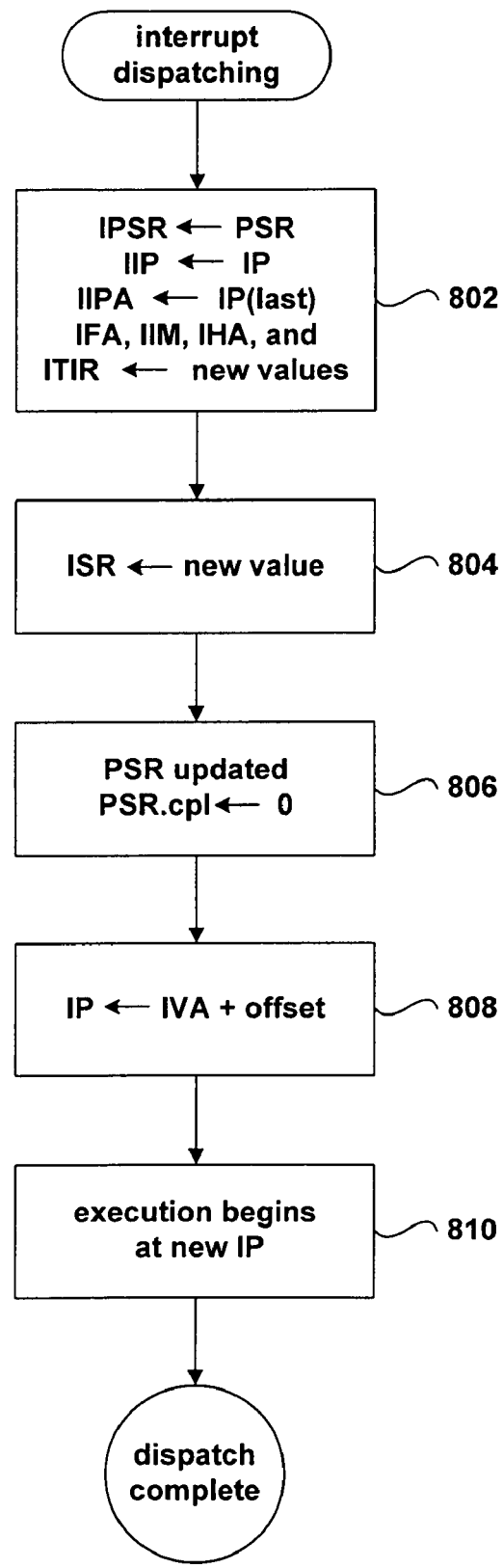
FIG. 8 is a flow-control diagram that describes the steps taken by a processor to dispatch an interruption.

FIG. 8 is a flow-control diagram that describes the steps taken by the processor to dispatch an interruption. When the interruption occurs, the processor, in step 802, stores the contents of the PSR and IP registers into the IPSR and IIP registers, stores the contents of the IP register at the time of execution of the last successfully executed instruction into the IIPA register, and updates additional interruption registers with new values reflective of the current interruption. In step 804, the processor updates the ISR register with information related to the type of interruption that has occurred, which, along with the identity of the interruption vector to which instruction execution has been directed, identifies the specific type of interruption that has occurred. In step 806, the processor updates the PSR register to place the processor into an interruption-handling state. As part of this update, the current priority level ("cpl") field within the processor status register, PSR.cpl, is updated to have the value "0", indicating the 0, or highest priority level. The Itanium processor handles all interruptions at the highest priority level. Next, in step 808, the processor places the address of an interruption vector (729 in FIG. 7) into the IP register and, in step 810, resumes execution by executing the first instruction in the interruption vector corresponding to the interruption pointed to by the contents of the IP register.

The Itanium processor features parallel instruction execution and pipelined instruction execution. Pipelining instructions greatly speeds instruction execution. Pipelined execution of instructions is similar to assembly-line mass production in a factory, where a number of different products are concurrently assembled as they pass through various assembly stations. Rather than executing a single instruction at a time, the processor executes portions of multiple instructions in assembly-line-like fashion. However, when an interruption occurs, the pipeline is flushed and then restarted, resulting in the loss of between 20 and 40 instruction cycles. As new processors continue to incorporate ever increasing amounts of pipelining and instruction-execution parallelism, the deleterious effects of pipeline flushes are expected to increase.

In the Itanium architecture, a class of instructions is considered to comprise privileged instructions, and can only be executed by a routine running at priority level 0, the highest of the four priority levels supported by the Itanium architecture. Operating systems are meant to execute at priority level 0, and have exclusive access to privileged instruction and registers, and generally set protection-key fields within translation-lookaside-buffer entries that provide address translations for OS-specific portions of memory and devices so that that these OS-specific portions of memory and devices are accessible only at priority level 0. The priority level and privilege-based partitioning of machine resources enable an operating system to exercise exclusive control over resources and instructions that, if used by an application program, would allow the application program to interfere with execution of other application programs or the operating system. However, when a virtual machine monitor is interposed between the hardware/firmware layer and one or more guest operating systems, the virtual machine monitor needs to maintain exclusive control over those privileged machine resources and instructions normally controlled by an operating system. Otherwise, a guest operating system executing above a virtual machine monitor may execute instructions or access privileged registers that would allow the guest operating system to interfere with execution of other guest operating systems or the virtual machine monitor. Thus, a virtual machine monitor needs to execute at priority level 0, and prevent both guest operating systems and application programs executing within application-program-execution environments provided by the guest operating systems, from executing at priority level 0 and thus having access to privileged instructions and registers.

However, in general, the virtual machine monitor needs to provide to each guest operating system a virtual machine interface essentially identical to the hardware/firmware interface above which the virtual machine monitor is layered. Because guest operating systems generally assume access to priority level 0, and, by executing at priority level 0, access to privileged instructions and registers, the virtual machine monitor cannot simply compel guest operating systems to execute at lower priority levels. Instead, the virtual machine monitor provides an illusion to guest operating systems that they are, indeed, executing at priority level 0 by providing a virtual priority level 0 used by guest operating systems. However, in fact, the virtual priority level 0 is mapped by the virtual machine monitor to a priority level lower than priority level 0 or, in other words, numerically larger than priority level 0. By doing so, the virtual machine monitor can intercept any and all attempts by guest operating systems to execute privileged instructions or other instructions which require software virtualization assistance, and instead emulate execution of the privileged instructions, or execute the privileged instructions on behalf of the guest operating systems, in order to maintain exclusive control over privileged registers and privileged instructions and present a consistent view of the virtualized machine state.

Figure 9:
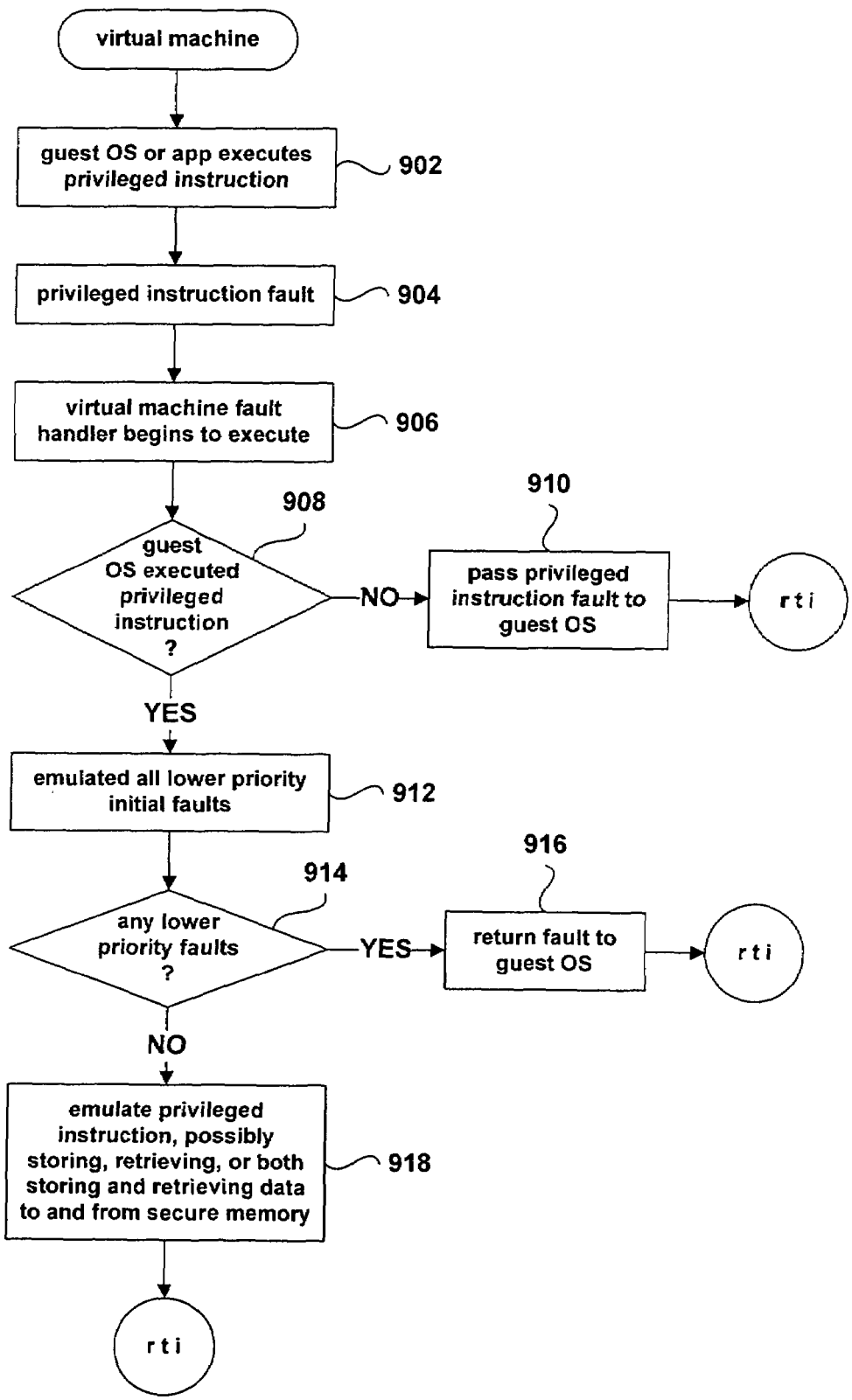
FIG. 9 is a flow-control diagram of a commonly used technique by which a virtual machine monitor intercepts guest-operating-system attempts to execute privileged instructions.

FIG. 9 is a flow-control diagram of a commonly used technique by which a virtual machine monitor intercepts guest-operating-system attempts to execute privileged instructions. In step 902, a guest operating system, or an application program executing in an application-program-execution environment provided by the guest operating system, attempts to execute an instruction needing virtualization. For example, a guest operating system may attempt to change the value of a field or flag in the process status register, or may attempt to insert a protection key into a protection-key register or alter the contents of a translation-lookaside-buffer entry. As another example, an application program may erroneously or inadvertently attempt to execute a privileged instruction, something an application program should never be allowed to do by an operating system.

When either a guest operating system or application program attempts to execute a privileged instruction, the Itanium processor detects that a process executing at a privilege level lower than the highest privilege level 0 has attempted to execute a privileged instruction, and generates a privileged instruction fault in step 904. The privileged instruction fault causes the Itanium processor, after updating interruption registers and the PSR, as discussed above with reference to FIG. 8, to begin executing instructions within the appropriate interruption vector in step 906. In general, the privileged-instruction-fault interruption vector transfers control to a privileged-instruction-fault interruption handler. The interruption handler needs to first determine whether or not the privileged instruction was attempted to be executed by a guest operating system, in step 908. If not, and the privileged instruction was attempted to be executed by an application program, then the interruption handler needs to pass the privileged instruction fault to the guest operating system providing the application-execution environment in which the offending application program is executing, in step 910.

In general, an interruption handling routine must examine the contents of one or more interruption registers in order to infer the identity of the process which attempted to execute the privileged instruction. If the interruption handling routine determines that a guest operating system attempted to execute the privileged instruction, in step 908, then the privileged-instruction-interruption-handling routine needs to execute or emulate the privileged instructions in the remaining steps of the flow-control diagram 912-918. Privileged-instruction faults occur at relatively high-interruption priority. Therefore, lower-priority interruptions that may accompany an attempt to execute a privileged instruction, such as interruptions resulting from an improperly formed instruction, improper operands, and other such instruction checking made by the machine, are masked by the higher priority privileged-instruction fault. For this reason, the privileged-instruction handling routine of the virtual machine monitor must first, in step 912, emulate the testing for all lower priority, initial faults accompanying the attempt to execute the privileged instruction. If any lower priority faults are determined by the privileged-instruction handling routine to have occurred, in step 914, then the privileged-instruction handling routine of the virtual machine monitor must return a lower-priority fault to the guest operating system, in step 916. Otherwise, in step 918, the privileged-instruction-fault handling routine emulates the execution of the privileged instruction and, in doing do, may store, retrieve, or both store and retrieve virtual-machine-monitor data to and from a secure memory accessible only to the virtual-machine monitor. By emulating the privileged instruction, the virtual machine monitor maintains the illusion, provided to the guest operating system, that the guest operating system is actually executing at priority level 0 and successfully using the full architecturally-provided instruction set and register set as would an operating system running directly above the machine interface, without a virtual machine monitor.

Obtaining secure memory for the virtual machine monitor that is protected from access by guest operating systems is generally implemented by adding additional bit flags and fields to translation-lookaside-buffer entries (608 in FIG. 6B) and by altering processor behavior to detect attempts, by guest operating systems, to access memory reserved for the virtual machine monitor. Unfortunately, adding bits to TLB entries may slow execution, and may prevent leverage from previous implementations.

Therefore, the above-described techniques for implementing virtual machine monitors, including providing to guest operating systems a virtual highest priority level, fielding all privileged-level-instruction faults, and altering machine-implemented data structures and logic in order to acquire and maintain a secret, secure memory unavailable to access by guest operating systems, is both difficult to implement, and potentially inefficient. Privileged level instructions normally execute in a few cycles when executed by a process truly running at priority level 0. If each privileged level instruction attempted to be executed by a guest operating system results in a machine interruption and running of a privileged-instruction-fault-handling routine, the pipelining efficiencies of the machine are compromised, and a much greater number of processor cycles is devoted to providing the functionality provided by privileged level instructions. As noted above, altering machine-implemented data structures and logic has disadvantages. For all of these reasons, cheaper and more flexible techniques for facilitating virtual machine monitor implementations are needed.

Figure 10:
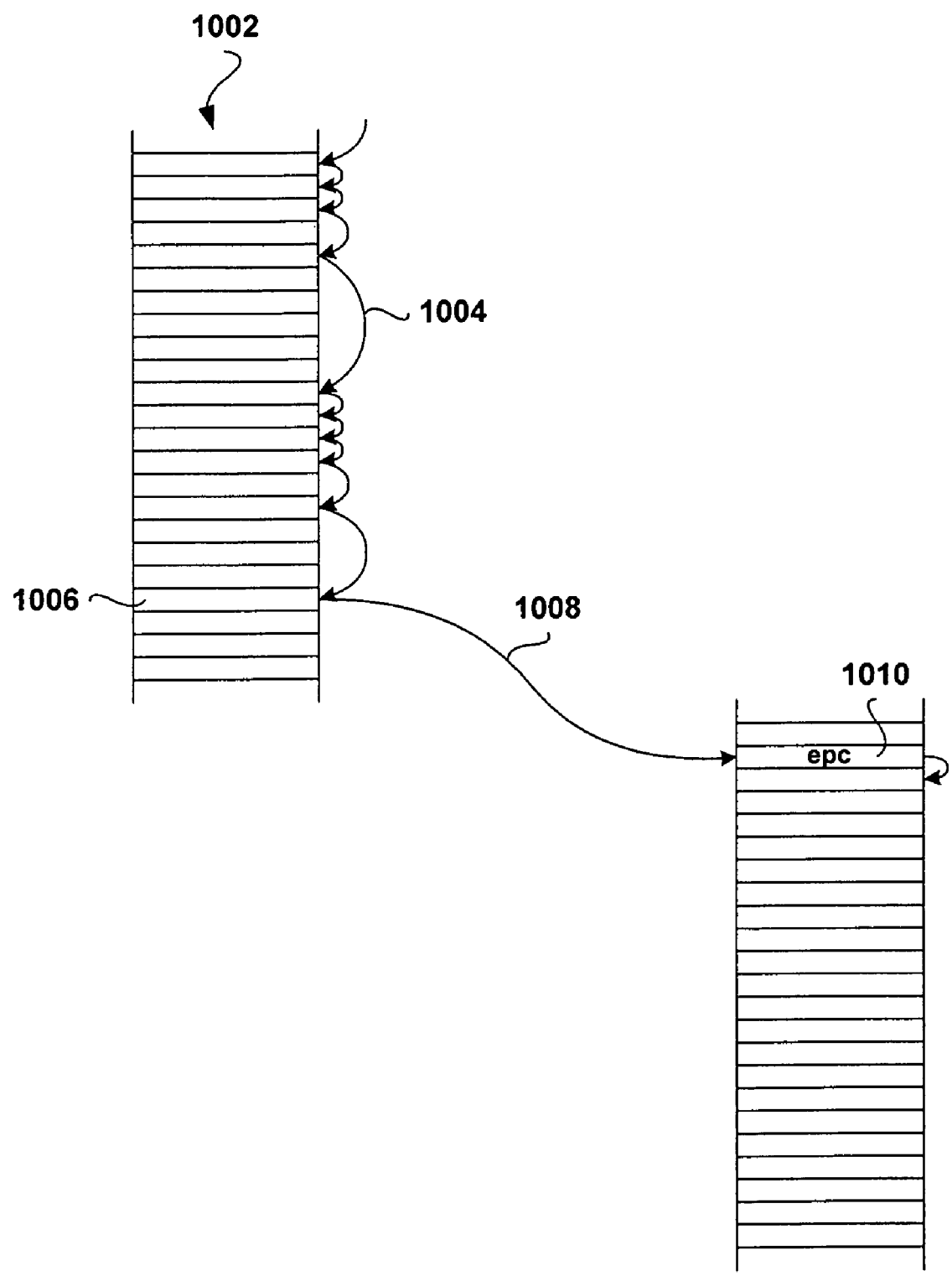
FIG. 10 illustrates operation of the epc instruction.

The Itanium processor architecture provides one mechanism for avoiding interruptions when transitioning between application programs and operating systems running at the highest privilege level. FIG. 10 illustrates operation of the epc instruction. In FIG. 10, an application program executes instructions 1002 within an application-program-priority-level page, with the thread of execution indicated, in FIG. 10, by curved arrows, such as curved arrow 1004. At instruction 1006, the application program calls an operating system routine in order to avail itself of an operating system service. This call, or branch, results in transfer of control 1008 to a first instruction 1010 of a high-level priority virtual-memory page including the first instruction 1010. The first instruction is an epc instruction that promotes the current priority level, maintained in the PSR register, to a higher-priority priority level, and instructions following the epc instruction constitute operating-system-service-routine instructions that execute at priority level 0 and that therefore have full access to privileged instructions and privileged registers. The transition from application-program execution to operating-system execution, facilitated by the epc instruction, involves no interruptions, and therefore neither degrades the pipelining efficiency of the processor nor incurs the state-saving overhead of machine interruption handling.

Figure 11:
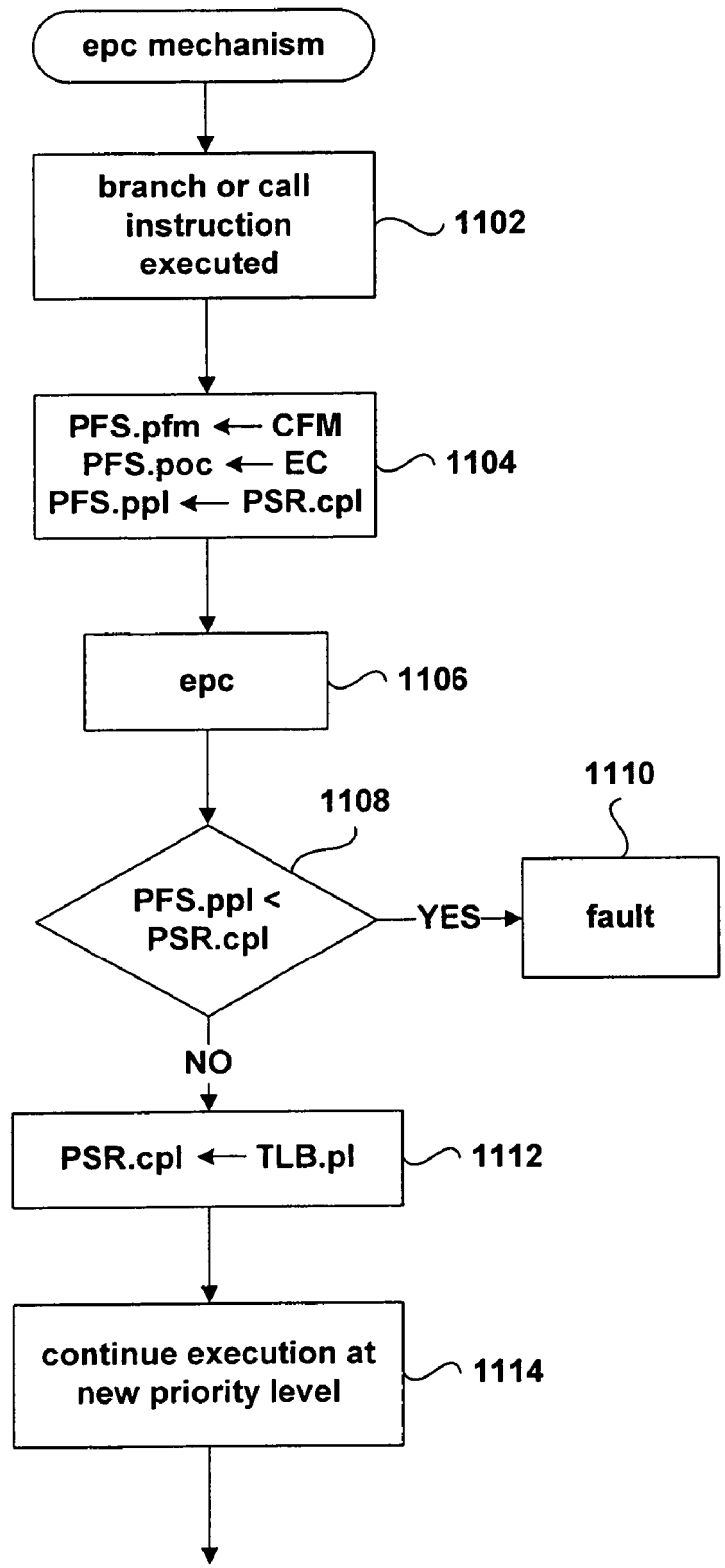
FIG. 11 is a high-level flow-control diagram of the epc-instruction mechanism.

FIG. 11 is a high-level flow-control diagram of the epc-instruction mechanism. In step 1102, a branch or call instruction is executed by a lower-priority-level routine in order to call a 0-priority-level operating system routine. In Step 1104, the Itanium processor saves the contents of the CFM and EC registers into fields within the PFS register, and saves the current machine priority level in a third field of the PFS register. Next, in step 1106, the machine begins execution of the epc instruction. First, in step 1108, the machine determines whether the previous machine priority level, currently stored in a field of the PFS register, is numerically less than the current machine priority level. If so, then an attempt has been made by the calling routine to emulate prior execution at a higher-priority priority level, so that the process may later be resumed at the higher-priority priority level, as stored in the PFS.ppl field, which is not allowed by the architecture. Therefore, in step 1110, a fault is generated. However, if the calling routine has successfully called a routine that executes at the same or a higher machine privilege level, then, in step 1112, the current machine priority level is set to the priority level of the virtual page containing the epc instruction, obtained from the translation-lookaside-buffer entry for that page. Finally, in step 1114, execution continues at the new priority level, generally the priority level 0, for execution of an operating system routine.

The epc mechanism would be an attractive vehicle for avoiding the pipelining interruption inefficiencies and interruption handling routine overheads incurred by virtual machine monitors. However, use of this mechanism needs also to be virtualized for use by guest operating systems. Therefore, it is extremely difficult to provide a virtual highest-priority level and virtual epc instruction while maintaining the true, highest-priority level for use only by the virtual machine monitor.

Figure 12:
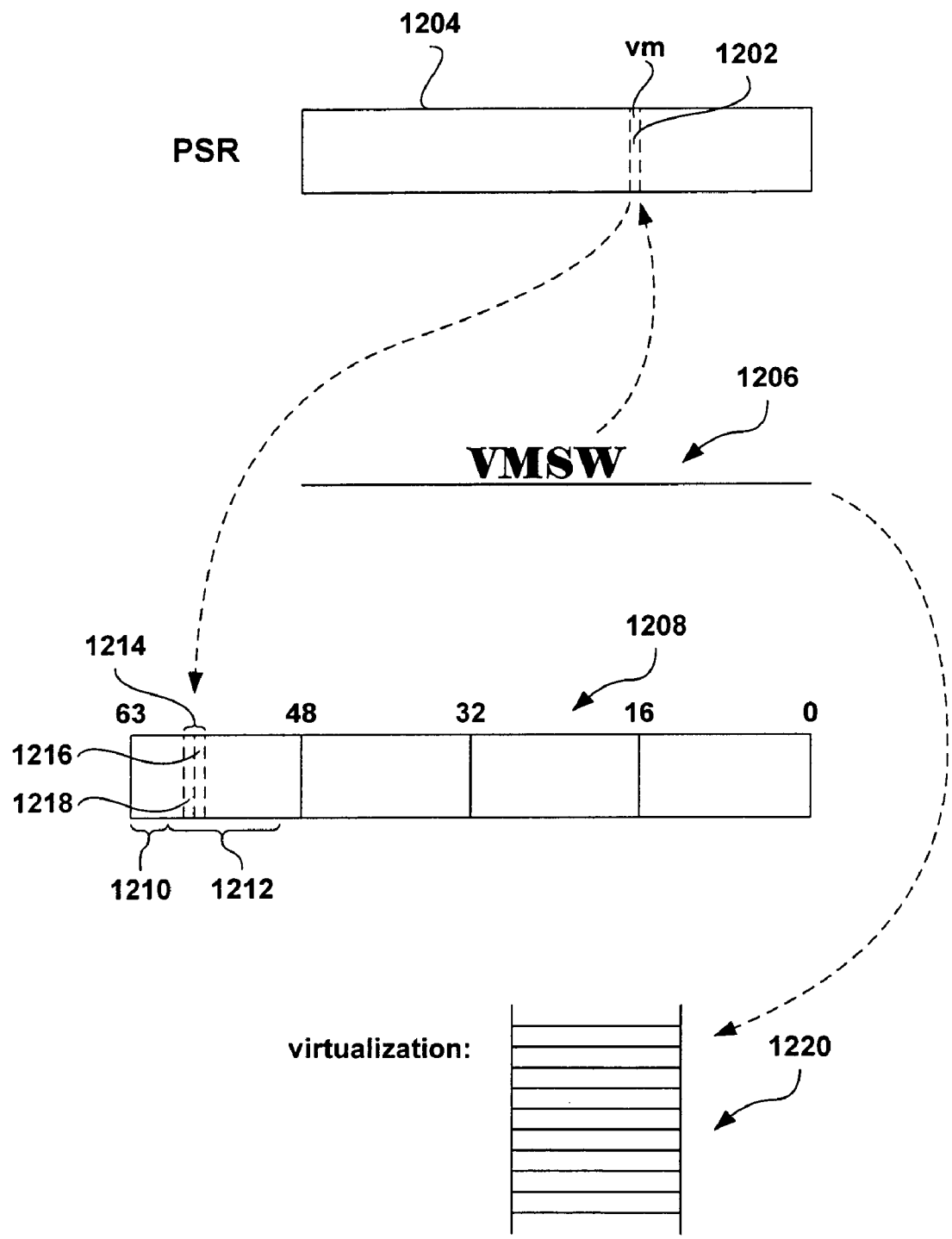
FIG. 12 summarizes a small set of processor-architecture enhancements that facilitate virtual machine monitor implementation in various embodiments of the present invention.

These problems and inefficiencies have motivated a search for straightforward enhancements of the Itanium-processor architecture, also relevant to a number of modern processors featuring architectures similar in form and capability to that of the Itanium processor, for better supporting virtual-machine-monitor implementation. FIG. 12 summarizes a small set of processor-architecture enhancements that facilitate virtual machine monitor implementation. A first enhancement is to add a virtualization-mode bit flag 1202 to the PSR register 1204. The virtualization-mode bit flag may be viewed logically as an addition of another bit to the current priority level field, cpl, of the PSR, effectively doubling the number of machine-supported priority levels from four to eight. Application programs and guest operating systems execute in virtualization mode, with the virtualization-mode bit flag PSR.vm is set to the value "1," in the described implementation, although an opposite convention for the virtualization-mode bit could be employed.

A next enhancement is the addition of a new instruction 1206, vmsw, to the Itanium instruction set. The vmsw instruction operates analogously to the epc instruction, described above, but instead of changing the priority level, the vmsw instruction changes the state of the virtualization-mode bit PSR.vm from 1 to 0, to enable a guest operating system to directly enter virtual-machine-monitor mode without incurring an interruption. A third enhancement is to add a flexible highest-implemented bit to the virtual address space, as shown with respect to a particular virtual address 1208. In the Itanium architecture, various processor implementations may choose to implement different virtual-address sizes. At minimum, any implementation must provide at least 51 bits of implemented virtual address space. As noted above, the highest three bits 1210 of a virtual address specify a region register. Thus, the Itanium processor allows a particular implementation to set the highest implemented virtual address bit to one of the bits in the range 1212 including bits 51-60. An operating system, during operating-system initialization, can determine the highest implemented virtual address bit through a firmware call. The virtual machine monitor enhancement related to highest implemented virtual address bits is to provide a flexible highest implemented virtual address bit 1214 by virtualizing the firmware call made by guest software running on the virtual machine. The virtual-machine-monitor-virtualized firmware call reports a virtual, or guest-operating-system highest implemented virtual address bit to guest operating systems that is one bit lower than the true highest implemented virtual address bit, as reported by the firmware call made by the virtual machine monitor. The processor, when executing in virtualization mode, detects attempts to access virtual addresses greater than the maximum virtual address provided by virtual-address bits up to and including the guest-operating-system highest implemented virtual address bit 1216. However, when executing in non-virtualization mode, in order to execute virtual-machine-monitor routines, the processor uses the true highest implemented virtual address bit 1218, thereby partitioning virtual address space into two equal portions, the lower-address portion accessible to processes running in virtualization mode, and the entire virtual-address space accessible to the virtual-machine-monitor routines operating in non-virtualization mode. A final processor-architecture enhancement is to provide a new fault, similar to the privileged-instruction fault, called a virtualization fault. This new fault is provided with its own interruption vector 1220. The virtualization fault is assigned to have a relatively low interruption priority, and is generated when a routine, executing at priority-level zero in virtualization mode, attempts to execute a privileged instruction or an instruction that needs software virtualization assistance.

The enhancements illustrated in FIG. 12 are used to facilitate virtual machine monitors as follows. First, the addition of a virtualization mode 1202 provides essentially four additional priority levels that can be used exclusively by the virtual machine monitor. Another way of looking at the virtualization mode is that it provides a state that distinguishes guest operating systems and application programs from virtual-machine-monitor routines without using the four-level priority scheme provided by the Itanium architecture. Virtualization mode allows a virtual machine monitor to provide virtual priority-level 0 to a guest operating system that has the illusion of a real priority-level 0, while still allowing interception of all operations that are required for virtualization.

The virtualization-mode state of the processor is indicated by a vm flag in the PSR, which can be toggled by a privileged instruction, either generally allowing for setting PSR flags, or a new instruction specifically providing for changing the virtualization-mode state of the machine. When an interruption occurs, the processor state is promoted both to non-virtualization mode as well as promoted to privilege level 0.

The new vmsw instruction provides a vehicle by which guest operating systems may be modified to avoid interruption overheads when calling privileged monitor functions. In one approach, performance profiling may be employed to identify critical privileged-instruction calls within guest operating systems. The identified critical privileged-instruction calls are then replaced with branch instructions targeting vmsw instructions in virtual-machine-monitor pages. However, it may not be practical to replace all privileged-instruction calls within operating systems by calls to virtual-machine-monitor routines via the vmsw instruction, and so, in those cases in which the vmsw instruction is not used, the virtual machine monitor may detect attempts by guest operating systems to execute privileged instructions via the new virtualization fault. However, because the virtualization fault occurs only when a priority-level 0 routine attempts to execute a privileged instruction, the virtual machine monitor no longer needs to determine whether or not the privileged instruction was attempted to be executed by an application program or a guest operating system. When the virtualization fault occurs, the virtual machine monitor knows immediately that an attempt to execute a privileged instruction by a guest operating system has generated a fault. Moreover, because the virtualization fault has a relatively low interruption priority, the virtualization-fault handler of the virtual machine monitor need not emulate the instruction and operand format checking done by the machine in order to determine whether or not higher-priority faults would have been generated. Instead, those faults are generated, and only if the privileged instruction is properly formatted and has proper operands is the virtualization fault triggered. Finally, the virtual machine monitor may store data and retrieve data from the high portion of virtual address space accessible only to the virtual machine monitor without needing to employ or require expensive alterations to virtual-memory machine data structures and logic in order to secure virtual-machine-monitor memory.

Figure 13A:
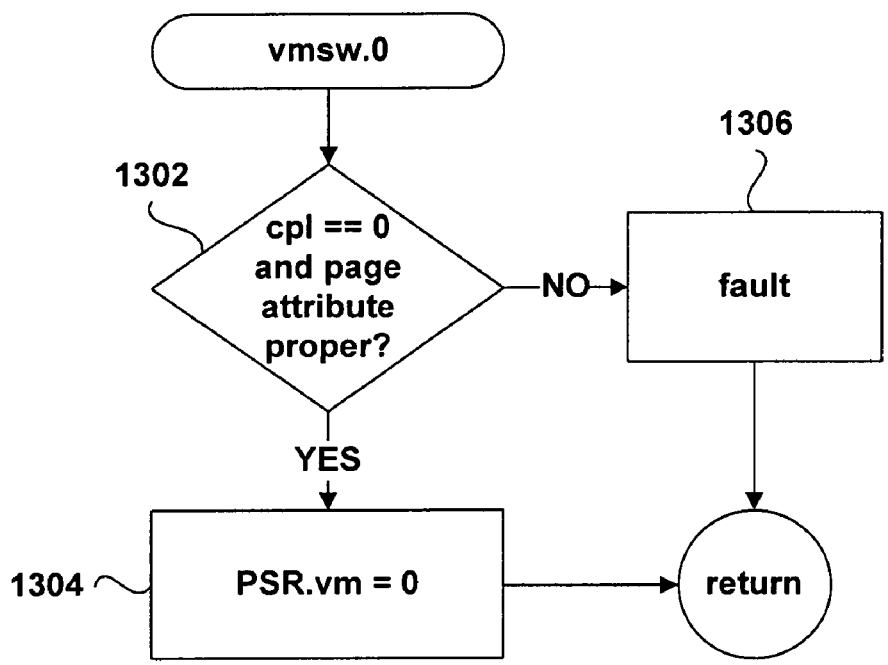
FIGS. 13A-B show a flow-control diagram illustrating operation of a new vmsw instruction that represents one embodiment of the present invention.
Figure 13B:
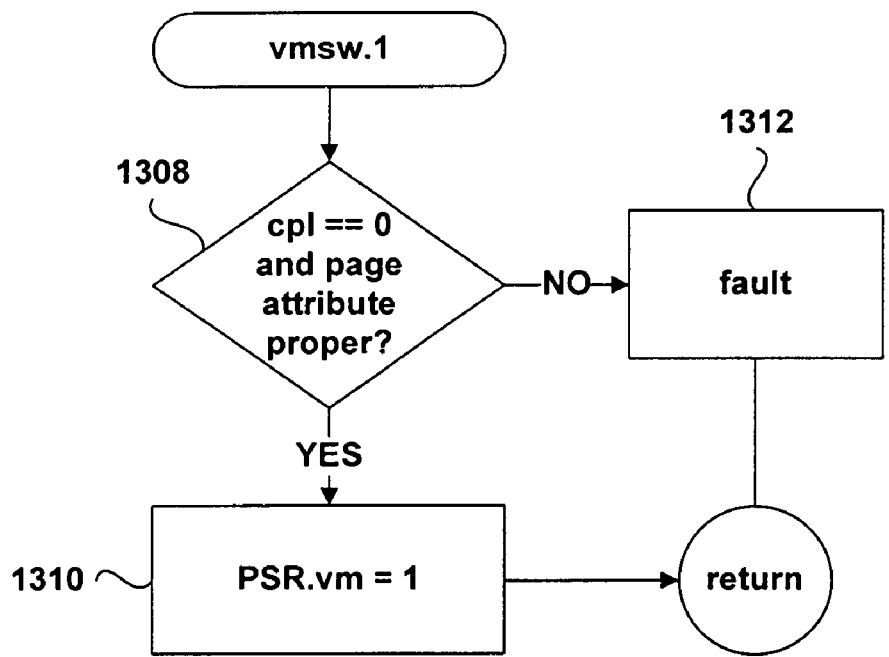

FIGS. 13A-B are flow-control diagrams that illustrate operation of two forms of the new vmsw instruction. In FIG. 13A, operation of the vmsw.0 instruction is illustrated. In step 1302, the processor determines whether the current priority level is 0 and the page containing the vmsw.0 instruction has appropriate attributes in its corresponding TLB entry to allow for promotion to non-virtualization mode. If the current priority level is 0 and the TLB-entry attributes are appropriate, the processor sets the value of the PSR.vm field to 0, in step 1304, completing execution of the vmsw instruction. Otherwise, in step 1306, a fault is raised. In FIG. 13B, operation of the vmsw.1 instruction is illustrated. In step 1308, the processor determines whether the current priority level is 0 and the page containing the vmsw.0 instruction has appropriate attributes in its corresponding TLB entry to allow for demotion to virtualization mode. If the current priority level is 0 and the TLB-entry attributes are appropriate, the processor sets the value of the PSR.vm field to 1, in step 1310, completing execution of the vmsw instruction. Otherwise, in step 1312, a fault is raised.

Figure 14:
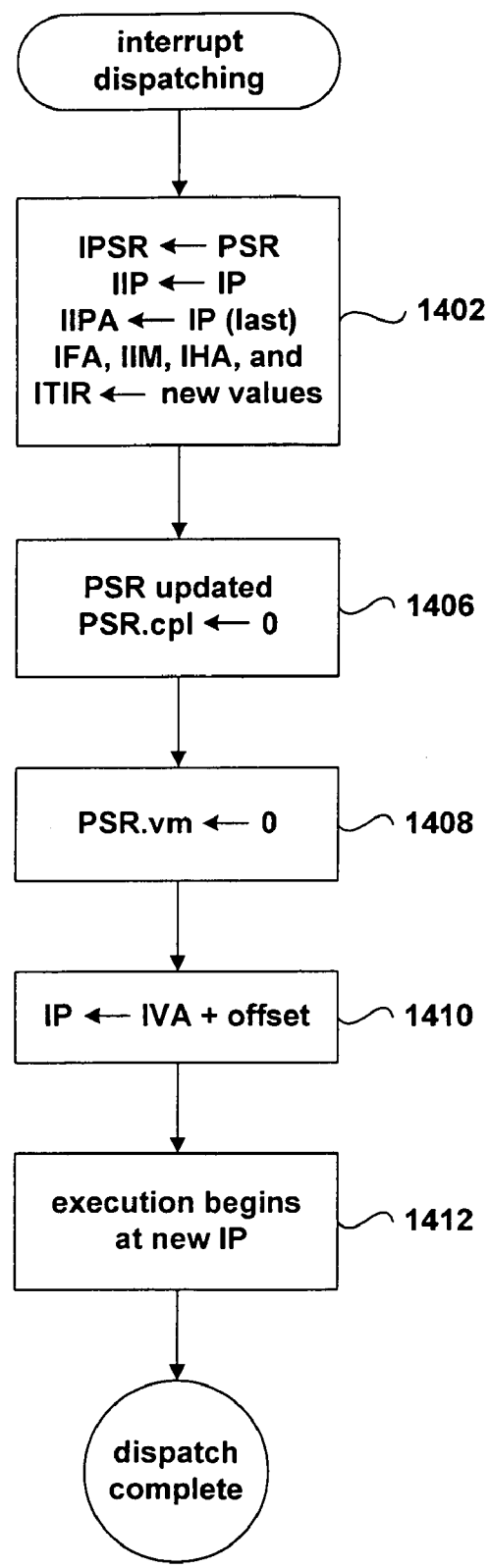
FIG. 14 is a flow-control-diagram illustration of interruption dispatching of a virtualization fault that represents one embodiment of the present invention.

FIG. 14 is a flow-control-diagram illustration of interruption dispatching of a virtualization fault. As with normal faults, the processor stores the contents of the PSR, IP, and the IP of the last successfully executed instruction into interruption status registers, in step 1402. Note that is not necessary to update the ISR for a virtualization fault, since the virtualization fault has its own interruption vector. In one embodiment, the ISR is updated, but not with information that identifies the interruption as a virtualization fault. In step 1406, the current priority level is set to 0. In step 1408, the contents of the vm field of the PSR are set to 0, to place the machine state into non-virtualization mode. Then in step 1410, the IP is loaded with the address of the interruption vector for the interruption, and instruction resumes within the interruption vector in step 1412.

Figure 15:
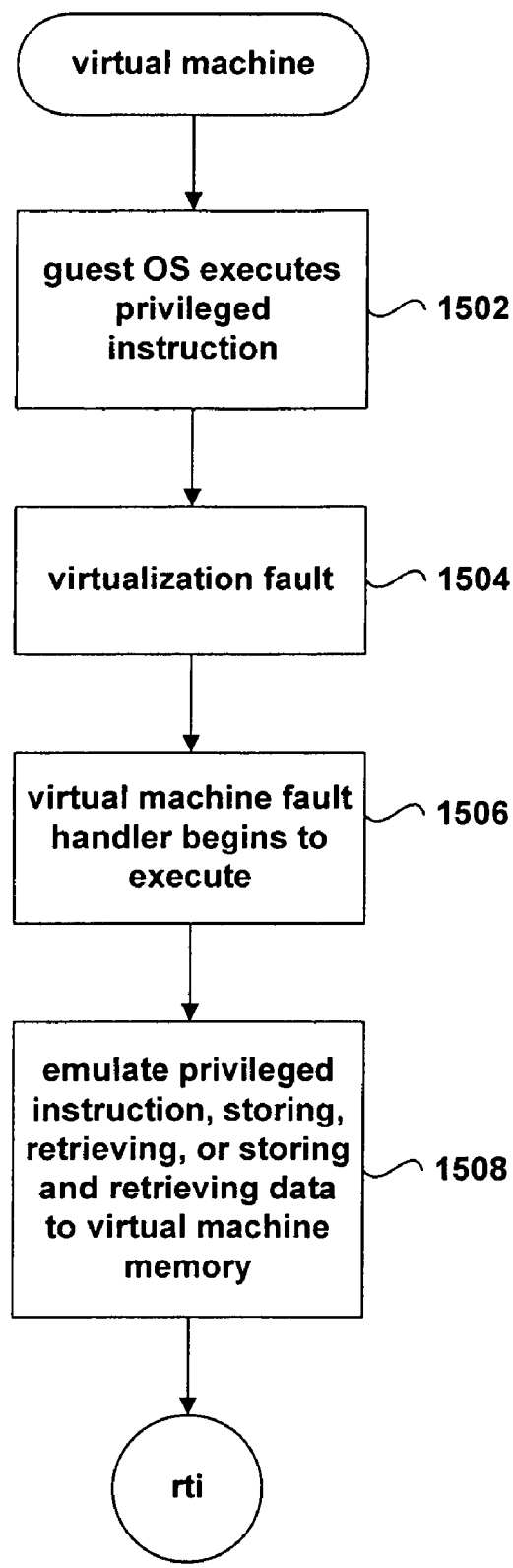
FIG. 15 is a flow-control diagram of the basic virtual machine monitor technique for maintaining control over privileged instructions and registers while supporting guest operating systems, using the processor-architecture enhancements shown in FIG. 11, which represents one embodiment of the present invention.

FIG. 15 is a flow-control diagram of the basic virtual-machine-monitor technique for maintaining control over privileged instructions and registers while supporting guest operating systems, using the processor-architecture enhancements shown in FIG. 12. FIG. 15 can be compared with FIG. 9 in order to appreciate the simplicity of implementation provided by the processor-architecture enhancement shown in FIG. 11. In step 1502, a guest operating system attempts to execute an instruction needing virtualization. As noted above, for one embodiment of the invention, privileged instructions generally remain in guest operating system code only for low-frequency-of-execution privileged instructions, with high frequency calls to privileged instructions replaced by calls to virtual-machine-monitor routines via the vmsw instruction. In step 1504, a virtualization fault is generated. In step 1506, a virtualization-fault handler of the virtual machine monitor begins to execute. In step 1508, the virtualization-mode-fault-handling routine emulates the privileged instruction, or executes the privileged instruction on behalf of the guest operating system, optionally storing data, retrieving data from, or both storing and retrieving data to the high partition of virtual address space accessible only to the virtual machine monitor. Unlike in previous implementations illustrated in FIG. 9, the virtual machine monitor virtualization-fault-handling routine does not need to waste processor cycles differentiating the case of an application program attempting to execute a privileged instruction from the case of a guest operating system attempting to execute a privileged instruction, and need not waste processor cycles emulating the higher-priority faults that may be generated by improperly formatted instructions or operands, since such faults occur at a higher interruption priority than the new virtualization-mode fault.

Although the present invention has been described in terms of a particular embodiment, it is not intended that the invention be limited to this embodiment. Modifications within the spirit of the invention will be apparent to those skilled in the art. For example, similar architectural enhancements may be made to any number of modem processors providing multiple priority levels and virtual-memory support similar to the priority levels in virtual-memory support provided by the Itanium processor. Not all of the above-described enhancements need to be made together in order to provide advantages for implementers of virtual machine monitors. For example, the new virtualization-mode fault, by itself, greatly facilitates implementation of efficient virtual machine monitors, even in the absence of the new vmsw instruction or the mechanism to make one virtual address bit appear to be unimplemented to guest operating systems. As with any logic-implemented enhancement, the above-described enhancements may be implemented in an almost limitless number of different logic circuits, firmware, or even software. The number of additional effective priority levels introduced by the vm bit, or a similar virtualization-mode flag, may vary depending on the machine architecture. The details of implementation of the virtualization fault also depend on the particular machine architecture in which a virtualization fault is introduced. The flexible highest-implemented-virtual-address bit may fluctuate by one bit, as described above, or by more than one bit, to allocate additional virtual-address space to the non-virtualization mode. The above-described processor-architecture enhancements do not foreclose additional processor-architecture enhancements that further support virtual machine monitors.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purpose of illustration and description. They are not intended to be exhaustive or to limit the invention to the precise forms disclosed. Obviously many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

The invention claimed is:

1. A computer processor that executes instructions and that supports virtual machine monitor operation and implementation, the computer processor comprising:
 a virtualization-mode processor state for execution of non-virtual-machine-monitor instructions;
 a non-virtualization-mode processor state for execution of virtual machine monitor instructions; and
 a virtualization-mode-switch instruction that
  before switching from one mode to another, checks to ensure that page attributes of a virtual memory page containing the virtualization-mode-switch instruction are compatible with the virtualization-mode-switch instruction,
  when executed by a process running in virtualization mode, checks to ensure that a current priority level is a most privileged virtualized priority level before switching from virtualization mode to non-virtualization mode, without incurring an interruption, to enable execution of one ore more virtual machine monitor instructions; and
  when executed by a process running in non-virtualization mode, checks to ensure that the current priority level is a highest priority level before switching from non-virtualization mode to virtualization mode without incurring an interruption.

2. A computer processor that executes instructions and that supports virtual machine monitor operation and implementation, the computer processor including:
 a virtualization-mode processor state for execution of non-virtual-machine-monitor instructions;
 a non-virtualization-mode processor state for execution of virtual machine monitor instructions; and
 a virtualization fault invoked by the computer processor when a routine executing in virtualization mode at a highest privilege level attempts to execute an instruction needing virtualization, the virtualization fault having a lower priority than improper-instruction-related faults, so that an associated virtualization-fault handler in a computer system including the computer processor can avoid emulating improper-instruction-related faults.

3. The computer processor of claim 2 wherein the processor is switched to non-virtualization mode when the virtualization fault is triggered by the computer processor.

4. A computer processor that executes instructions and that supports virtual machine monitor operation and implementation, the computer processor including
    a virtualization-mode processor state for execution of non-virtual-machine-monitor instructions;
    a non-virtualization-mode processor state for execution of virtual machine monitor instructions; and
    a flexible highest-implemented-virtual-address bit that, in virtualization mode, is checked by the processor and reported by the virtual machine monitor to be less than the highest-implemented-virtual-address bit in non-virtualization mode, so that a high-order portion of virtual-address space is accessible only to a virtual machine monitor executing in non-virtualization mode, while a low-order portion of virtual-address space is accessible to both the virtual machine monitor executing in non-virtualization mode and to one or more processes executing in virtualization mode.

5. A method for enhancing a computer processor to support virtual-machine-monitor operation and implementation, the method comprising:
    to a computer processor that executes instructions and that provides registers, adding
        a virtualization-mode processor state for execution of non-virtual-machine-monitor instructions;
        a non-virtualization-mode processor state for execution of virtual machine monitor instructions; and
        a virtualization-mode-switch instruction that
            before switching from one more to another, checks to ensure that page attributes of a virtual memory page containing the virtualization-mode-switch instruction are compatible with the virtualization-mode-switch instruction,
            when executed by a process running in virtualization mode, checks to ensure that a current priority level is a most privileged virtualized priority level before switching from virtualization mode to non-virtualization mode, without incurring an interruption, to enable execution of one ore more virtual machine monitor instructions; and
            when executed by a process running in non-virtualization mode, checks to ensure that the current priority level is a highest priority level before switching from non-virtualization mode to virtualization mode without incurring an interruption.

6. A method for enhancing a computer processor to support virtual-machine-monitor operation and implementation, the method comprising:
    to a computer processor that executes instructions and that provides registers, adding
        a virtualization-mode processor state for execution of non-virtual-machine-monitor instructions;
        a non-virtualization-mode processor state for execution of virtual machine monitor instructions; and
        a virtualization fault invoked by the computer processor when a routine executing in virtualization mode at a highest privilege level attempts to execute an instruction needing virtualization, the virtualization fault having a lower priority than improper-instruction-related faults, so that an associated virtualization-fault handler in a computer system including the computer processor can avoid emulating improper-instruction-related faults.

7. The method of claim 6 further comprising switching the processor to non-virtualization mode when the virtualization fault is triggered by the computer processor.

8. A method for enhancing a computer processor to support virtual-machine-monitor operation and implementation, the method comprising:
    to a computer processor that executes instructions and that provides registers, adding
        a virtualization-mode processor state for execution of non-virtual-machine-monitor instructions;
        a non-virtualization-mode processor state for execution of virtual machine monitor instructions; and
        a flexible highest-implemented-virtual-address bit that, in virtualization mode, is checked by the processor and reported by the virtual machine monitor to be less than the highest-implemented-virtual-address bit in non-virtualization mode, so that a high-order portion of virtual-address space is accessible only to a virtual machine monitor executing in non-virtualization mode, while a low-order portion of virtual-address space is accessible to both the virtual machine monitor executing in non-virtualization mode and to one or more processes executing in virtualization mode.

9. A method for supporting multiple, concurrent guest operating systems in a computer system, the method comprising:
    providing a virtual-mode bit flag in a processor of the computer system;
    providing a virtualization-mode-switch (vmsw) instruction in the processor that changes the state of the virtualization-mode bit flag to enable a guest operating system to directly enter virtual-machine-monitor mode without incurring an interruption;
    providing a virtualization fault with an interruption vector, assigned to have a relatively low interruption priority, that is generated when a routine, executing at high priority in virtualization mode, attempts to execute a privileged instruction or an instruction that needs software virtualization assistance and that is associated with a virtualization fault handler; and
    providing a virtual-machine monitor that executes privileged instructions on behalf of guest operating systems and provides to each guest operating system a virtual machine interface, the virtual-machine monitor invoked by vmsw instructions or a virtualization fault.

10. The method of claim 9 wherein address space is reserved for exclusive use by the virtual-machine monitor.

11. The method of claim 10 wherein the address space reserved for exclusive use by the virtual-machine monitor is addressed by addresses including a highest bit of implemented virtual address space, the virtual-machine monitor reporting a smaller implemented address space to guest operating systems addressed by addresses that do not include the highest bit of implemented virtual address space.

12. A computer-readable medium encoded with computer instructions that implement a method for supporting multiple, concurrent guest operating systems in a computer system, the method comprising:
    providing a virtual-mode bit flag in a processor of the computer system;
    providing a virtualization-mode-switch (vmsw) instruction in the processor that changes the state of the virtualization-mode bit flag to enable a guest operating system to directly enter virtual-machine-monitor mode without incurring an interruption;

providing a virtualization fault with an interruption vector, assigned to have a relatively low interruption priority, that is generated when a routine, executing at high priority in virtualization mode, attempts to execute a privileged instruction or an instruction that needs software virtualization assistance and that is associated with a virtualization fault handler; and providing a virtual-machine monitor that executes privileged instructions on behalf of guest operating systems and provides to each guest operating system a virtual machine interface, the virtual-machine monitor invoked by vmsw instructions or a virtualization fault.

* * * * *

UNITED STATES PATENT AND TRADEMARK OFFICE
CERTIFICATE OF CORRECTION

PATENT NO.         : 7,421,689 B2                                    Page 1 of 1
APPLICATION NO. : 10/695267
DATED              : September 2, 2008
INVENTOR(S)        : Jonathan K. Ross et al.

It is certified that error appears in the above-identified patent and that said Letters Patent is hereby corrected as shown below:

In column 5, line 34, delete "modem" and insert -- modern --, therefor.

In column 5, line 41, delete "modem" and insert -- modern --, therefor.

In column 14, line 49, in Claim 1, delete "ore" and insert -- or --, therefor.

In column 15, line 9, in Claim 4, after "including" insert -- : --.

In column 15, line 47, in Claim 5, delete "ore" and insert -- or --, therefor.

Signed and Sealed this

Thirtieth Day of December, 2008

JON W. DUDAS
*Director of the United States Patent and Trademark Office*